Oct. 1, 1957
M. ÖZBILGIC
2,807,881
ADJUSTABLE STEP BLOCK
Filed July 1, 1954
2 Sheets-Sheet 1
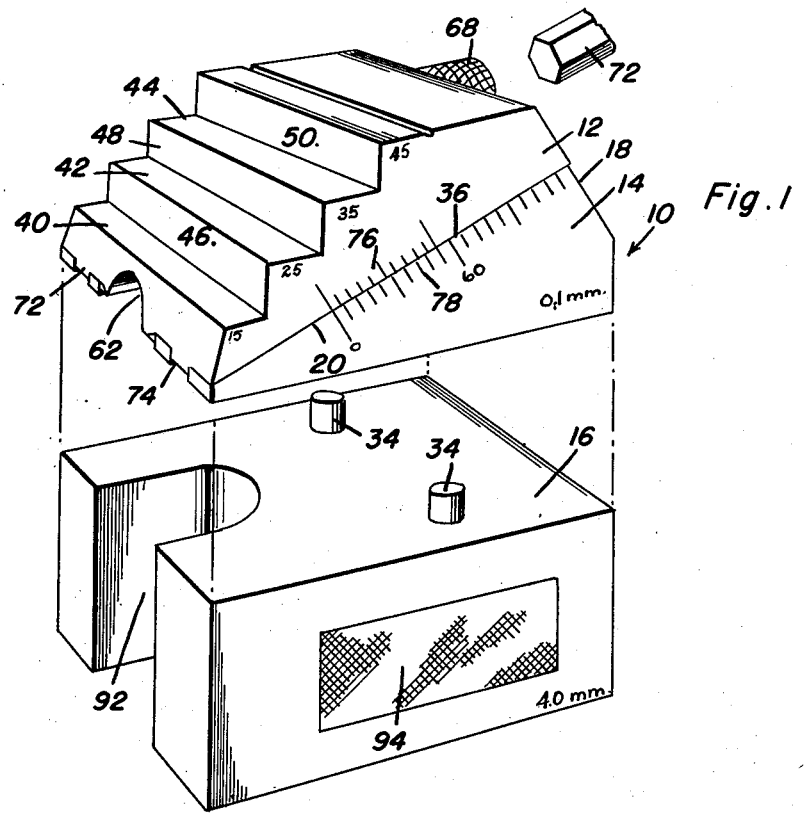
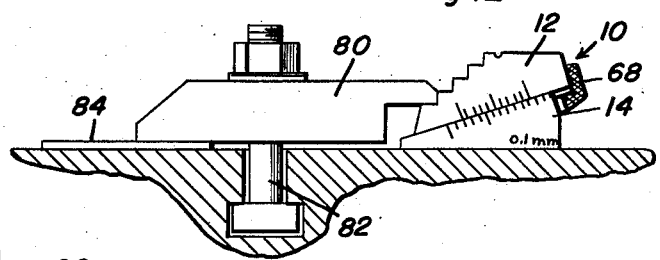
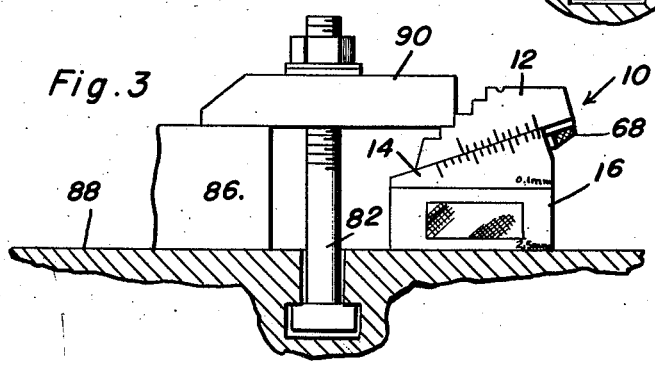
Mustafa Ozbilgic
INVENTOR.

Oct. 1, 1957  M. ÖZBILGIC  2,807,881
ADJUSTABLE STEP BLOCK
Filed July 1, 1954  2 Sheets-Sheet 2
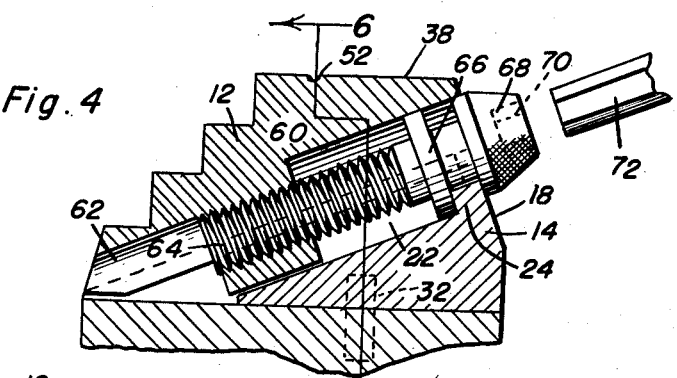
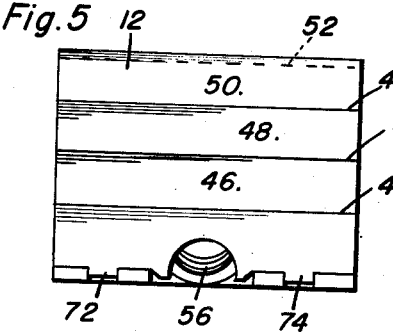
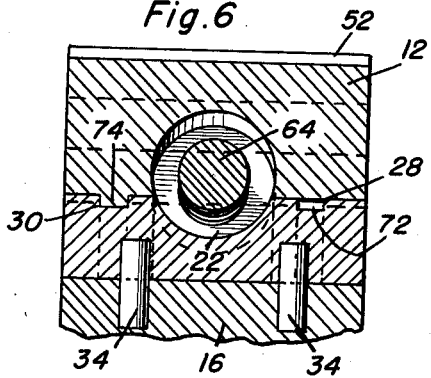
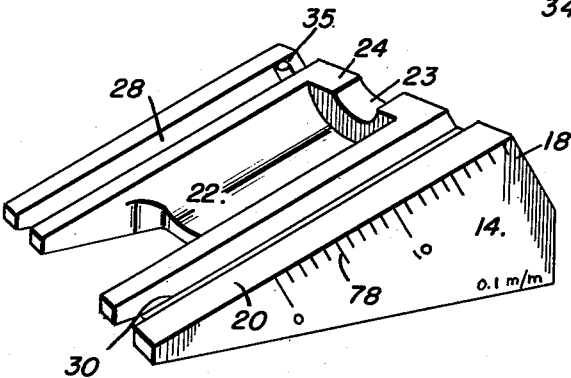
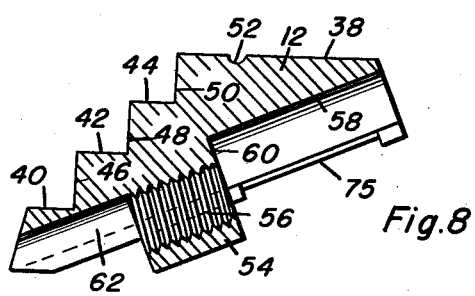
Mustafa Ozbilgic
INVENTOR.

United States Patent Office 2,807,881
Patented Oct. 1, 1957

2,807,881

ADJUSTABLE STEP BLOCK

Mustafa Özbilgic, Yenimahalle, Turkey

Application July 1, 1954, Serial No. 440,620

2 Claims. (Cl. 33—162)

This invention relates to a class of machine tools and more particularly to a novel adjustable step block.

The primary object of the present invention resides in the provision of means for use in combination with workpiece clamps for fastening workpieces to any suitable machine tool, such as a horizontal or vertical milling machine, a jig boring or universal boring machine, mill presses, shaping machines, and the like, in a manner so that the step block comprising the present invention can be adjusted to compensate for the height of the workpiece.

A further object of the invention resides in the provision of an adjustable step block which has upper and lower flat surfaces which are constructed so as to be mechanically true and which may be raised or lowered with respect to each other utilizing a novel threaded adjustment screw which cooperates with vernier indicia formed on the side faces of the upper and lower wedges forming elements of the present invention.

The construction of this invention especially features upper and lower wedge members which are arranged so as to cooperate with each other to provide a continuously true horizontal surface for engagement by one end of the clamp with the height of the portion engaged by the end of the clamp being adjusted after having been predetermined by the machinist.

Still further objects and features of this invention reside in the provision of an adjustable step block that is strong and durable, simple in construction and manufacture, capable of being manufactured in various sizes and shapes for particular functions, and with different graduations, and which is extremely easy to utilize.

These, together with the various ancillary objects and features of the invention which will become apparent as the following description proceeds, are obtained by this adjustable step block, a preferred embodiment of which has been illustrated in the accompanying drawings, by way of example only, wherein:

Figure 1 is a perspective view of the adjustable step block comprising the present invention;

Figure 2 is a side elevational view illustrating the manner in which the adjustable step block may be utilized to clamp a particular size workpiece in position;

Figure 3 is a view similar to that of Figure 2 showing the device in use clamping a different size workpiece on the bed of the machine;

Figure 4 is a vertical sectional view of the adjustable step block;

Figure 5 is a front elevational view of the invention;

Figure 6 is a sectional detailed view as taken along the plane of line 6—6 in Figure 4;

Figure 7 is a perspective view of the lower wedge member; and

Figure 8 is a vertical sectional view of the upper wedge member.

With continuing reference to the accompanying drawings wherein like reference numerals designate similar parts throughout the various views, the reference numeral 10 generally designates the adjustable step block comprising the present invention, which includes an upper wedge member 12 and a lower wedge member 14, the lower wedge member being adapted to be positioned upon a spacer block 16 when such is necessary.

The lower wedge member 14 is of substantially triangular shape in cross section but is provided with a sloping rear face 18 as well as a sloping upper surface 20. As can be best seen in Figure 7, the lower wedge member 14 has an arcuate recess 22 in the upper surface 20 thereof which terminates short of the rear face 18 of the lower wedge member 14 so as to form a rear wall 24. Additionally, grooves 28 and 30 are formed in the upper surface 20 of the lower wedge member 14 on either side of the recess 22. A depression or recess 23 is formed in the wall 24. The lower wedge member 14 further has a pair of recesses 32 in the lower surface thereof for reception of the pins 34 rising upwardly from the spacer block 16. A stop pin 35 extends upwardly from groove 28.

The upper wedge member 12 is provided with a sloping lower surface 36 complementary to the surface 20 of the lower wedge member 14. The top surface 38 of the upper wedge member 12 is formed by a plane parallel to the plane of the lower surface of the lower wedge block 14 and thus when the lower wedge member 14 is resting on a true horizontal surface, the upper surface 38 will be horizontal.

Formed in the forward face of the upper wedge member 12 are steps formed by alternate horizontal surfaces 40, 42, and 44, and vertical surfaces 46, 48, and 50. A groove 52 is formed in the upper face 38 of the upper wedge member 12 for indicating a limit for the position of the clamp member which is adapted to engage the step block. The upper wedge member 12 has a downwardly extending projection 54 which is internally threaded as at 56. A recess 58 is formed in the lower surface of the upper wedge member 12 and terminates at the projection 56. Another recess 62 is formed in the lower surface of the upper wedge member 12 to permit passage of the adjusting screw 64 when such is threaded in the internally threaded portion 56 of the projection 54.

The screw member 64 is provided with a collar 66 thereon which is adapted to engage the shoulder formed by the recess 22 of the lower wedge member 14. The adjusting screw 64 is provided with a knurled head 68 having a depression 70 therein for reception of an Allen wrench 72 or other similar tool. The head 68 and the collar 66 embrace the wall 24. Hence, upon rotation of the head 68 of the adjusting screw 64 the upper wedge member 12 will be moved.

The upper wedge member 12 is further provided with tongues 72 and 74 which seat in the grooves 28 and 30 in the upper face of the lower wedge member 14 to guidingly lock the upper wedge member to the lower wedge member for movement thereon. The tongue 72 is recessed at 75 for reception of stop pin 35.

The upper wedge member as well as the lower wedge member has indicia as at 76 and 78 thereon, the indicia 78 being in the form of a scale having graduations of such size as to indicate divisions of the vertical dimensions of the vertical faces 46, 48 and 50 which are equal to each other. The indicia 76 is in the form of a vernier so that the divisions of each of the dimensions indicated by the indicia 78 can be determined.

In use, this device is adapted to enable the clamping member such as is indicated at 80 in Figure 2 to be held on the T-shaped threaded member 82 in such manner as to hold down the workpiece 84 in a secure manner with the clamping member 80 having maximum bearing surface on the workpiece 84. This is accomplished by first measuring the thickness or height of the workpiece 84 and then adjusting the adjustable step block 10 so that a portion of the clamp member 80 will engage a horizontal surface of the adjustable clamp block 10 on a point compensating for the thickness of the workpiece 84.

Should a workpiece 86 of greater dimensions than the adjustable step block 10 be utilized, its height is measured and then utilizing the spacer block 16, the adjustable step block 10 can be secured thereto and then adjusted so that while the horizontal surfaces of the step block 10 will be at a predetermined height above the bed 88 of the table so that the clamp member 90 can be properly seated thereon so as to provide a maximum bearing surface on the workpiece 86.

It is noted that the spacer block 16 may be provided with a groove 92 therein for reception of the T-bolt 82 and may have knurled faces 94 for enabling it to be more easily grasped.

The stop pin 35 rides in recess 75 to limit the relative travel of the upper wedge member 12 and lower wedge member 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An adjustable step block comprising upper and lower complementary wedge members, the upper surface of the upper wedge member lying in a plane parallel to the plane of the lower surface of the lower wedge member, said upper wedge member having a stepped front face having alternate vertical and horizontal surfaces extending respectively normal to and parallel with said lower surface, said lower wedge member having a recess in the upper surface thereof terminating short of the rear face of said lower wedge member to form a first limit stop shoulder, an internally threaded projection extending downwardly from the lower surface of said upper wedge member, said upper wedge member having a recess in the lower surface thereof terminating at said projection forming a second limit stop shoulder, a threaded adjusting screw threadedly engaging said projection, a collar on said screw engaging said first limit stop shoulder, and a head on said screw engaging said rear face of said lower wedge member, said collar riding in said recess in said upper wedge member and being adapted to be engaged by said second limit stop shoulder, said lower wedge member having grooves in said upper surface thereof positioned on each side of said recess in said lower wedge member, and complementary tongues seated in said grooves depending from said upper wedge member.

2. An adjustable step block comprising upper and lower complementary wedge members, the upper surface of the upper wedge member lying in a plane parallel to the plane of the lower surface of the lower wedge member, said upper wedge member having a stepped front face having alternate vertical and horizontal surfaces extending respectively normal to and parallel with said lower surface, said lower wedge member having a recess in the upper surface thereof terminating short of the rear face of said lower wedge member to form a first limit stop shoulder, an internally threaded projection extending downwardly from the lower surface of said upper wedge member, said upper wedge member having a recess in the lower surface thereof terminating at said projection forming a second limit stop shoulder, a threaded adjusting screw threadedly engaging said projection, a collar on said screw engaging said first limit stop shoulder, and a head on said screw engaging said rear face of said lower wedge member, said collar riding in said recess in said upper wedge member and being adapted to be engaged by said second limit stop shoulder, said lower wedge member having grooves in said upper surface thereof positioned on each side of said recess in said lower wedge member, complementary tongues seated in said grooves depending from said upper wedge member, vernier indicia on the complementary side faces of said upper and lower wedge members, said indicia having graduations indicating divisions of the dimensions of said vertical surfaces, a spacer block, and means connecting said lower wedge member to said spacer block, said lower wedge member being positioned on said spacer block.

References Cited in the file of this patent

UNITED STATES PATENTS

| 386,469 | Howard | July 24, 1888 |
| 1,228,791 | Laubscher | June 5, 1917 |
| 2,518,080 | Schury | Aug. 8, 1950 |